(12) United States Patent
Hill (10) Patent No.: US 8,130,089 B2
(45) Date of Patent: Mar. 6, 2012

(54) FLAT ALERT SYSTEM

(76) Inventor: Carl U. Hill, Longmont, CO (US)

( * ) Notice: Subject to any disclaimer, the term of this patent is extended or adjusted under 35 U.S.C. 154(b) by 351 days.

(21) Appl. No.: 12/477,841

(22) Filed: Jun. 3, 2009

(65) Prior Publication Data

US 2009/0303028 A1    Dec. 10, 2009

Related U.S. Application Data

(60) Provisional application No. 61/058,559, filed on Jun. 4, 2008.

(51) Int. Cl.
*B60B 23/00* (2006.01)
(52) U.S. Cl. .................................. 340/442; 340/447
(58) Field of Classification Search .................. 340/442, 340/447; 73/146.5
See application file for complete search history.

(56) References Cited

U.S. PATENT DOCUMENTS

2007/0194896 A1* 8/2007 Ehrlich et al. ................ 340/447
* cited by examiner

*Primary Examiner* — Shirley Lu
(74) *Attorney, Agent, or Firm* — Michael Ries (57) ABSTRACT

A sensor unit and an associated transmitter unit are enclosed, or encased, within a housing, to form a monitoring device, and a thus formed monitoring device is positioned either inside or outside of each tire to be monitored. For tires that are 18 inches or smaller, the monitoring device is preferably attached to the bottom of a specially designed valve stem that is secured to the vehicle's tire where the monitor is located within the tire. For tires that are 20 inches or larger, the monitoring device is preferably attached to the side of another specially designed valve stem that is secured to the vehicle's tire where the monitor is located outside the tire. The same monitoring device is used for each location.

4 Claims, 9 Drawing Sheets

FLAT ALERT SYSTEM

REFERENCE TO RELATED APPLICATION

This patent application claims the benefit of U.S. Provisional Application No. 61/058,559 filed on 4 Jun. 2008, the disclosure of which is incorporated herein by reference in its entirety.

BACKGROUND OF THE INVENTION

1. Field of the Invention

This invention relates generally to tire monitoring and, more particularly, to a system, method and apparatus for remotely monitoring tires on towed trailers and truck/trailer combinations, for abnormal tire conditions, such as low tire pressure and/or high tire temperature where the receiver need not be reprogrammed when a vehicle changes trailers.

2. Description of the Related Art

The most common cause of low tire pressure and flat tires is puncturing of the tire by a sharp object, such as a nail, which lets air out. Depending on the size of the hole, the tire may deflate slowly or rapidly. Another cause of low tire pressure and/or a flat tire is a failure of or damage to the valve stem through which air in the tire can leak out. Sometimes, low pressure in a tire may be caused by vandalism. Examples of this can be as simple as letting air out through the valve stem, which is easily repairable by simply refilling the tire, or slashing the sidewalls, which may require replacing the tire.

A tire may be damaged in a collision with another vehicle or by an object that causes the rubber of the tire to separate from the wheel, or rips the tire. Excessive wear of the tire tread to the point where even blunt stones or a pot hole in the road may puncture the rubber and cause a slow air leak in the tire.

Tires can leak air due to a variety of reasons. These include, but are not limited to: a damage to the wheel itself, a damaged valve stem, a puncture in the tire, which sometimes may be hard to find if the puncture was caused by an object that didn't embed itself in the tire, such as can happen by running over a board with nails sticking out, and by improper installation of the tire, which could involve the bead of the tire being cut when a tire is being mounted on the rim.

It is also noted that tires lose air over time. A new tire, properly inflated, will lose air even when there is no puncture in the tire. A primary cause for this loss of tire pressure in a new tire is the slow leakage of air through the valve stem. Given enough time, a tire can fully deflate with no obvious or detectable reason.

It is now well known that vehicle tires can, and should, be monitored to avoid unwanted damage due to the occurrence of abnormal tire conditions, two such conditions being, for example, low tire pressure and high tire temperature. Numerous devices have been suggested for monitoring of tires to detect abnormal tire conditions, and, particularly, for monitoring tires to detect low tire pressure.

In the United States, vehicles manufactured after model year 2007 were required to have tire pressure monitoring systems built-in. It is understood that this requirement does not apply to trailers. Aftermarket tire pressure monitors from various companies are available which notify the driver of a vehicle of the tire pressure in each wheel, as well as exactly which tire of the system is being displayed. A much less expensive way to monitor tire pressures is to install valve stem caps that alert the driver to low tire pressure. These work by first setting the pressure on the cap to match the pressure a driver desires for the tires. Once installed on the tire's valve stem, the tip of these caps will change color (from green, to yellow, to red) when the tire becomes under-inflated. Its disadvantages include questionable accuracy, specifically if the caps aren't tightened down enough and the only way to monitor them is from outside of the vehicle by looking directly at the cap.

A much more active approach to monitoring tire pressures involves retrofitting a tire pressure monitor to the vehicle. One such arrangement disclosed in the prior art for sensing tire pressure and temperature is U.S. Pat. No. 5,708,411. In the patent a sensing unit is unattached, it is free floating within the tire casing and is freely movable therein where its movement is normally due to gravity forces when no movement of the tire is occurring and due to centrifugal forces when the tire is being rotated.

SUMMARY OF THE INVENTION

This invention provides a simple and inexpensive, yet effective and dependable, system, device and method for monitoring tires to detect predetermined abnormal tire conditions, such as low tire pressure and/or high tire temperature, and provide an indication thereof to allow timely correction of the detected abnormal conditions. More particularly, when an abnormality is sensed with respect to a monitored vehicle tire condition, an output signal indicative thereof is transmitted to a remotely positioned receiver unit providing an indication of abnormal tire condition detection, with the receiver unit preferably including a reception distance controller having an adjustable distance calibrated control for establishing the maximum distance of receiver unit response.

A sensor unit and an associated transmitter unit are preferably enclosed, or encased, within a housing, to form a monitoring device, and a thus formed monitoring device is positioned either inside or outside of each tire to be monitored.

For tires that are 18 inches or smaller, the monitoring device is preferably attached to the bottom of a specially designed valve stem that is secured to the vehicle's tire where the monitor is located within the tire.

For tires that are 20 inches or larger, the monitoring device is preferably attached to the side of another specially designed valve stem that is secured to the vehicle's tire where the monitor is located outside the tire.

The same monitoring device is used for each location.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings.

DESCRIPTION OF THE INVENTION

Figure 1:
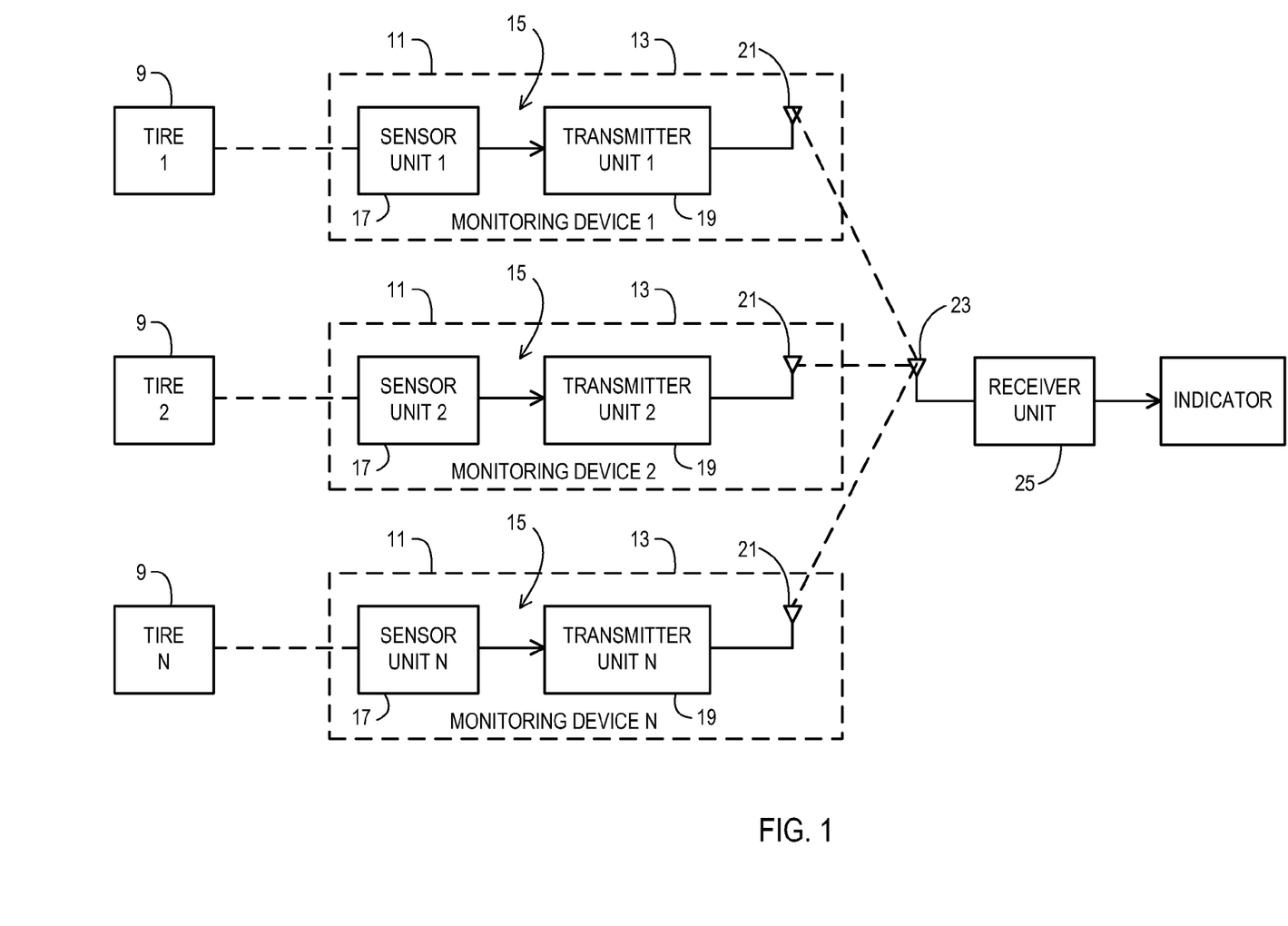
FIG. 1 is a simplified block diagram illustrating the system of this invention.

As indicated in FIG. 1, a plurality of tires 9 of a vehicle are individually monitored to detect the presence of one or more abnormal tire conditions, such as low tire pressure and/or high tire temperature.

A monitoring device 11 is used in connection with a different one for each of the tires, 9, and, as indicated in FIG. 1, each monitoring device, 11, includes a housing unit, or enclosure, 13, having a sensor/transmitter unit, 15, where the unit, 15, includes a sensor unit, 17, and an associated transmitter unit, 19, with a transmitting antenna, 21, enclosed or encased, therein (and preferably encapsulated therein).

Output indications of abnormal tire conditions of monitored tires 9 are provided by each sensor unit 17 to its associated transmitter unit 19 and unit 19, which is responsive to receipt of an output indication from sensor unit 17, provides output signals that are transmitted from transmitting antenna 21 and received at receiving antenna 23 of receiver unit 25.

The output signals from all of the transmitting units 19 of the system are commonly received at receiver unit 25 and, responsive to receipt of an output signal from any of the transmitter units, receiver 25 provides an indication of abnormal tire condition detection, which indication is normally provided to indicator 27, which may be a part of the receiver unit, where the indication is displayed by a visual display provided, for example, by energizing an LED, a beeper or the like.

Depending on the size of the tire, the sensor/transmitter (monitoring device) is located either inside the tire or on the outside of the tire. For tires which are 18 inches or smaller, the sensor/transmitter is attached to a specially constructed valve stem that is secured to the tire and the sensor/transmitter is located within the tire. For tires which are 20 inches or larger, the sensor/transmitter is attached to another specially constructed valve stem that is secured to the tire and the sensor/transmitter is located outside of the tire.

Figure 2A:
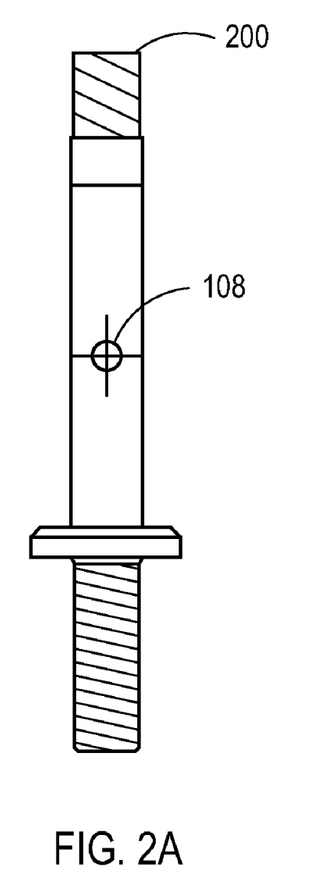
FIG. 2A is a partial prospective view of a specially designed valve stem that is secured to the vehicle's tire for mounting a transmitter outside a tire that is 20 inches and above.
Figure 2B:
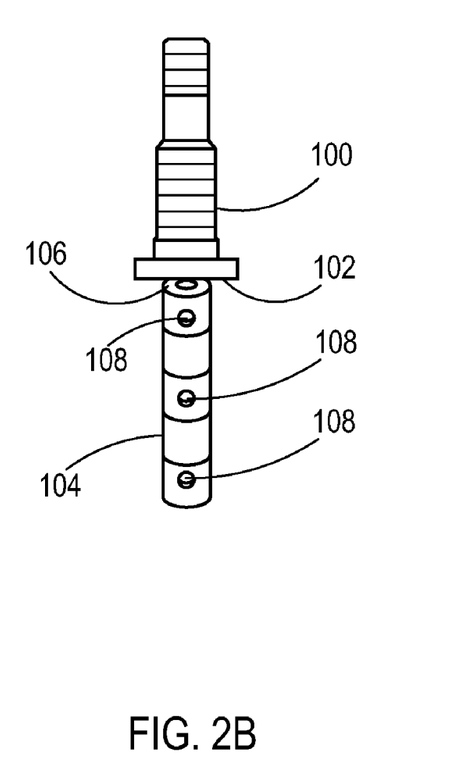
FIG. 2B is a side view of a specially designed valve stem that is secured to the vehicle's tire for mounting a transmitter inside a tire that is 18 inches and smaller.
Figure 2C:
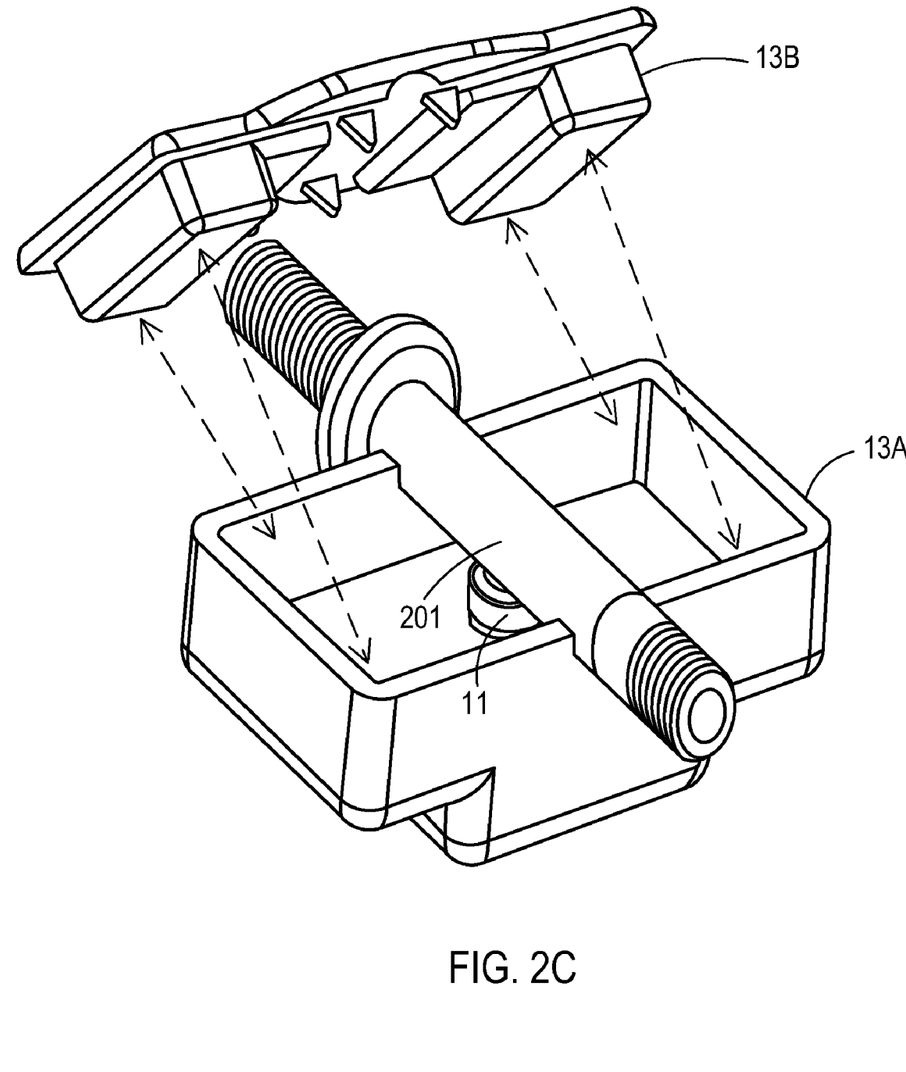
FIG. 2C is an exploded view of the cover and base of a monitoring device attached to the valve stem of FIG. 2A.
Figure 2D:
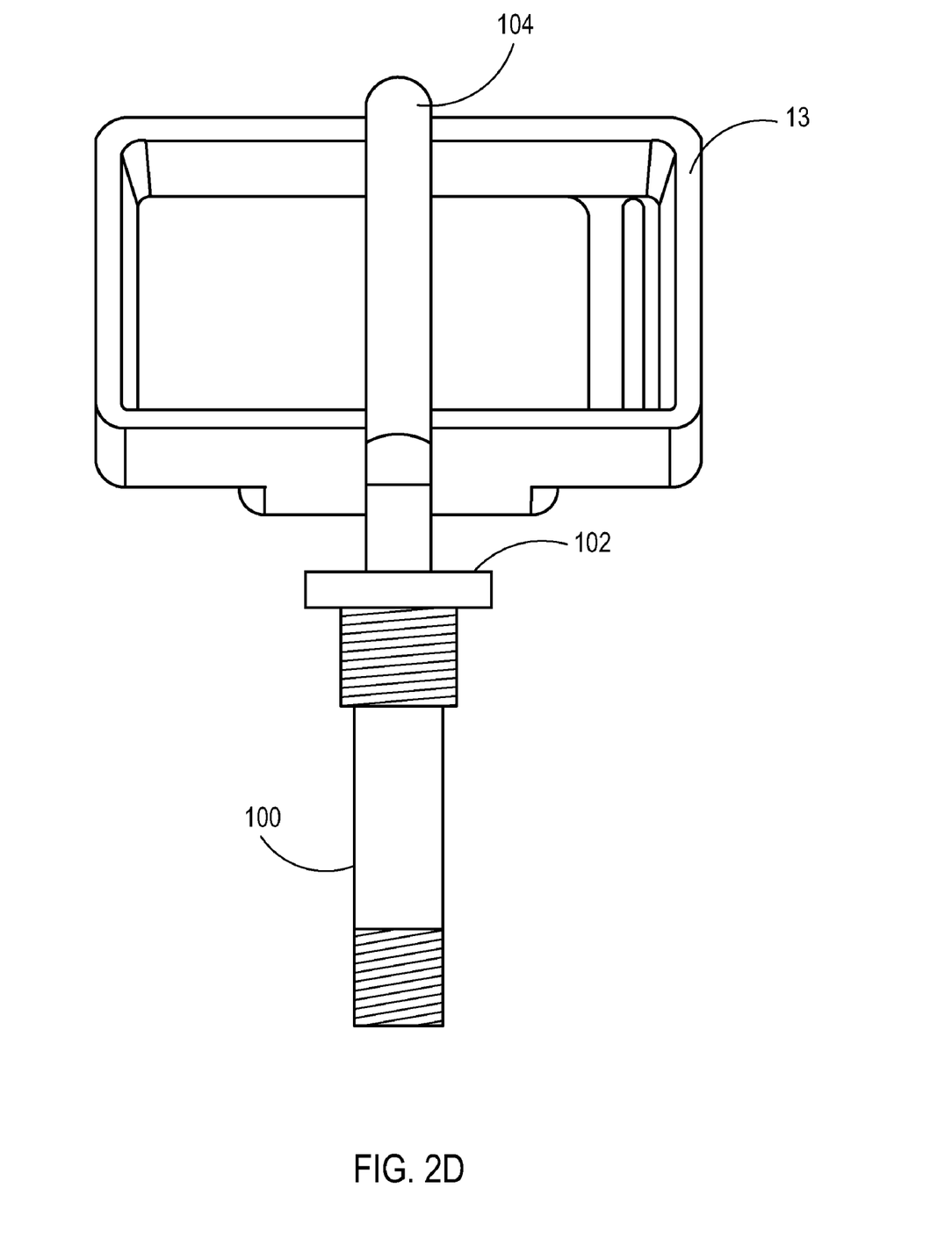
FIG. 2D is a perspective view of a monitoring device attached to the valve stem of FIG. 2B.

Referring to FIGS. 1, 2B, and 2D, for tires that are 18 inches or smaller, monitoring device 11 is preferably attached to the bottom of a specially designed valve stem that is secured to the vehicle's tire where the monitor is located within the tire. The bottom 102 of valve stem 100 is securely coupled by brazing, silver solder or the like to an end of a cylindrical member 104 having a centrally located through opening 106 (not shown in FIG. 2D) which extends from the top to the bottom of member 104. The opening 106 communicates with an air passageway that extends from the bottom to the top of the valve stem 100. Air passageways 108 (not shown in FIG. 2D) located in the side of bottom member 104 communicate with the centrally located thru opening 106. A monitoring device (not shown) referred to below is securely coupled to the bottom end of member 104. Openings 108 communicate with centrally located thru opening 106 and the air passageway that extends from the bottom to the top of the valve stem 100 to allow air to be added to the tire.

Referring to FIGS. 1, 2A and 2C, for tires that are 20 inches or larger, monitoring device 11 is preferably attached to the side of another specially designed valve stem that is secured to the vehicle's tire where the monitor is located in a housing having a bottom 13A and a cover 13B that is outside the tire. The side of valve stem 201 has an opening 108 which communicates with a central passageway in the valve stem that extends from one end to the other end. A monitoring device (not shown) referred to below is securely coupled to the side of valve stem 200 and is connected to detect the temperature and pressure of the air in the tire thru opening 108.

Figure 2E:
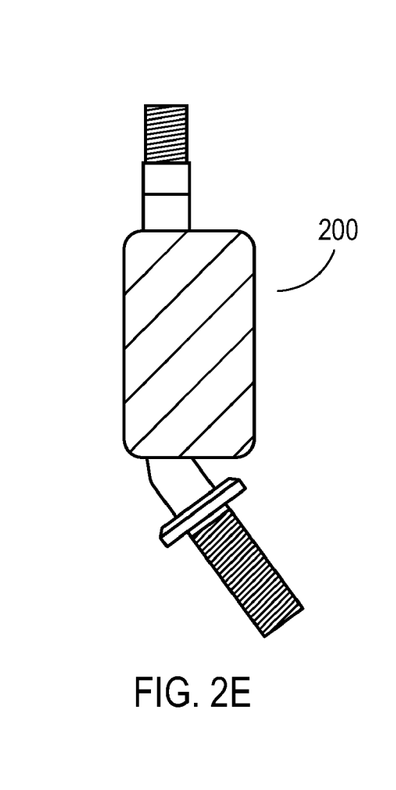
FIG. 2E-2H show four types of transmitters.
Figure 2F:
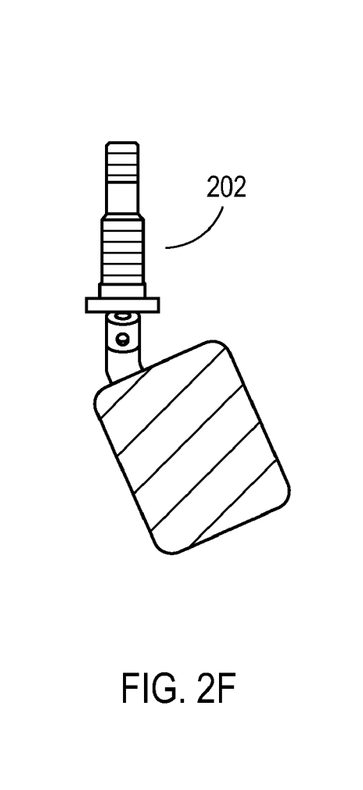
Figure 2G:
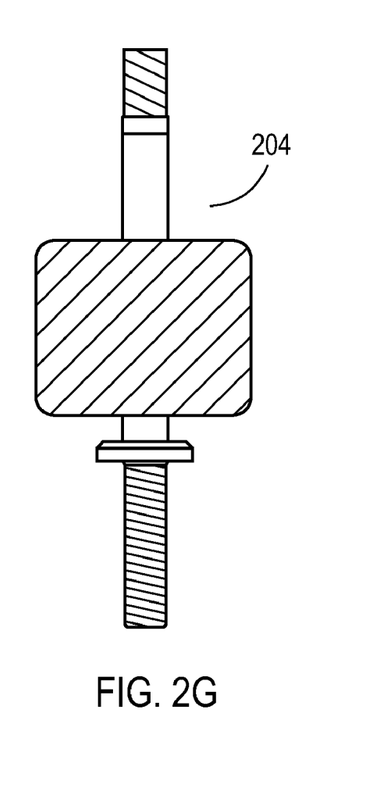
Figure 2H:
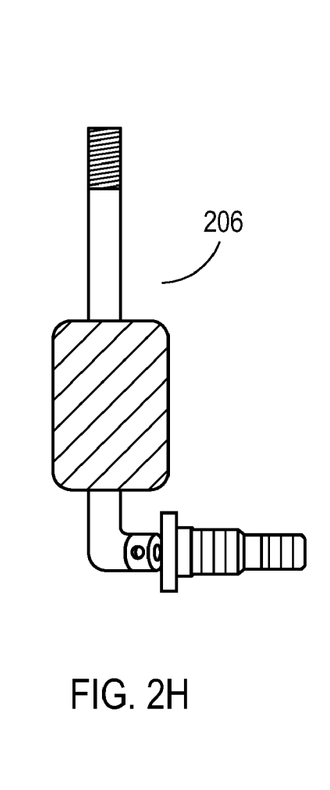

FIGS. 2E-2G illustrate four types of transmitters. FIG. 2E is a trailer (exterior) transmitter 200; FIG. 2F is a trailer (interior) transmitter 202; FIG. 2G is a truck (steel wheel) transmitter 204; and FIG. 2H is a truck (aluminum wheel) transmitter 206.

Each monitoring device 11, which is attached to the bottom of the valve stem 100 or to the side of the valve stem 200 is preferably relatively small and lightweight relative to the size and weight of tire 9, and in a working embodiment of the monitoring device, can have a housing size of about two and one-half inches in circumference, about three-fourths of an inch in depth and a weight of under about three ounces. Regardless of the size of the tire and the valve stem to which the monitoring device is attached, the monitoring device that is attached to either valve stem can be similar in size, construction and operation.

Each sensor/transmitter is identical in design. Each contains a printed circuit board that is rectangular rather than round and the motion sensor container is soldered directly to the PCB. A motion sensor and components to sense pressure and temperature are powered with a 3 volt lithium battery. Each is encapsulated with epoxy within a high impact plastic case. Each sensor sets itself after a first pressure check with a handheld pressure reader (referred to latter), and sends a signal when the tire pressure is 20 percent below a normal recommended tire pressure after being inflated. Should a tire go flat, or a new tire is mounted, the transmitter will need to be reset for a new signal point with the pressure reader. This needs to be done only once to set the setting, and the settings will not change with future checks unless the tire goes below 20 pounds of pressure, goes flat, or is replaced. Then the first check must be repeated to set the signal point.

Figure 3:
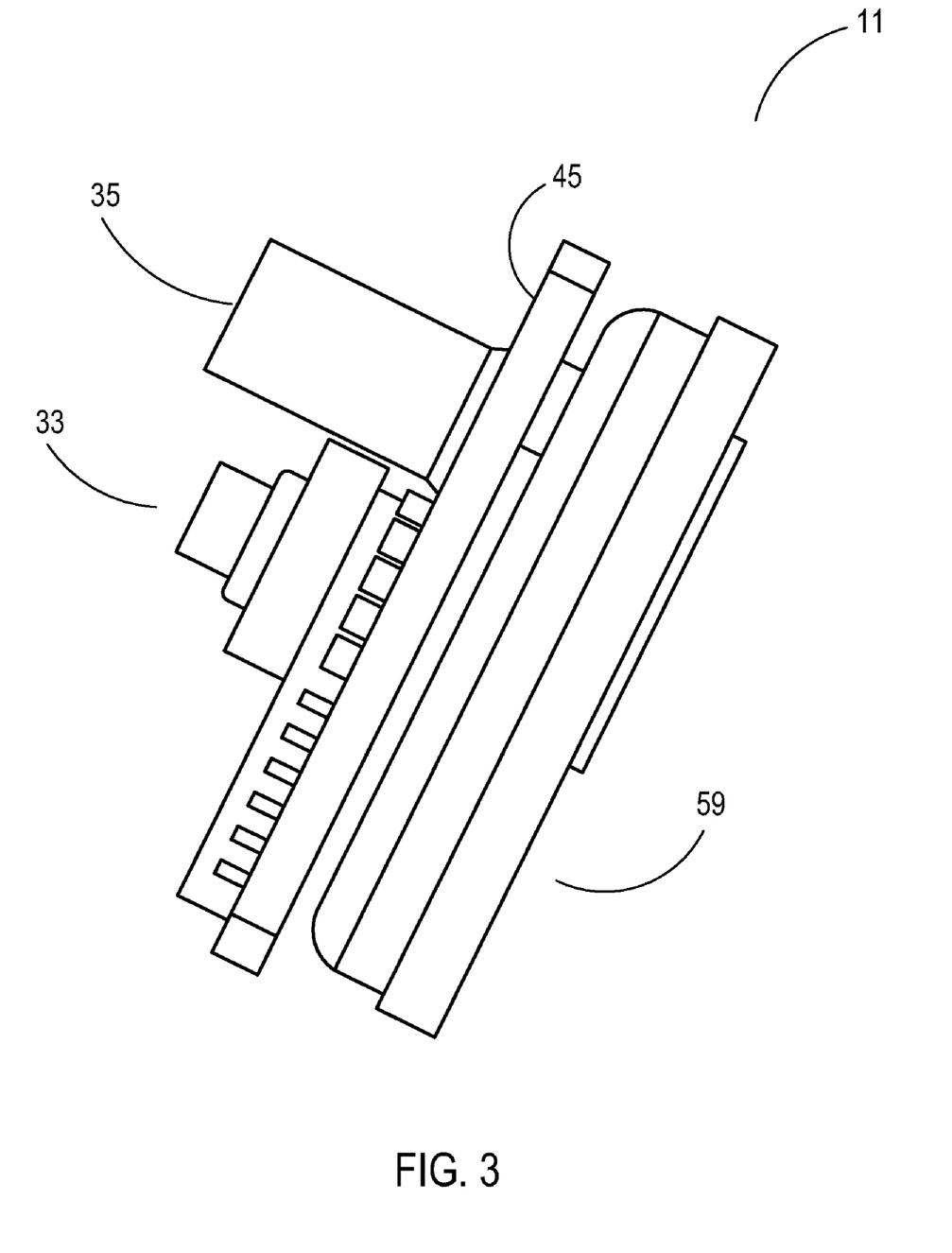
FIG. 3 is a side view of the monitoring device shown in FIG. 2C.

FIG. 3 discloses an embodiment of a sensor/transmitter. As specifically indicated in FIG. 3, when low tire pressure is an abnormal tire condition being sensed, a pressure sensor 33 that is exposed to air within the tire is responsive to the air pressure being monitored, as is well known.

Normally, pressure sensor 33 can be a mechanical switch, or a solid state device which includes a body portion mounted on a printed circuit board. The pressure sensor is responsive to incremental changes in sensed pressure which establishes a trigger sensing point corresponding to a predetermined desired low tire pressure at which an output indication of low tire pressure is provided by the pressure sensor (the low tire pressure can normally vary from about 85 psi down to about 20 psi depending upon the size of the tire to be monitored).

As indicated in FIG. 3, printed circuit board 45 is provided in monitoring device 11 and has the necessary processing circuitry for both pressure and motion sensor units, 33, 35, and transmitter unit mounted thereon or adjacent thereto.

When the tires of the vehicle are to be monitored to sense high tire temperature as an abnormal tire condition, a temperature sensor such as a thermistor, positioned at an opening of housing unit 13, of the monitoring device can be provided to operate at a predetermined output trigger point, with the trigger point being chosen to correspond to a predetermined high temperature (for example, at about 275 degrees F.), as is well known.

Power for monitoring device 11 is internally provided by battery unit 59, as indicated in FIG. 3. Sufficient power is achieved through use of a lithium battery that providing three volts over an extended period of time (these batteries are able to withstand temperatures of between about −50 degree F. and 300 degree F. and have an extended shelf life).

Monitoring device 11 which includes the transmitter attaches to one of numerous types of valve stems. It is encased in a specially designed plastic case which is filled with epoxy after the components have been installed. It is pre-set to send a signal to the receiver when the air pressure in the tire drops 20% below normal operating pressure. It will also send a signal if the tire heats up to over 230 degrees F. It is powered with a 3 volt button cell lithium battery. Life expectancy of the battery is 5 years or more.

Each transmitter sets itself after a first pressure check with a hand held pressure reader to send a signal at 20% below normal recommend tire pressure after being inflated. Should a tire go flat, or a new tire is mounted, the transmitter will need to be reset for a new signal point with the pressure reader. This needs to be done once to set a setting and will not change with future checks unless the tire goes below 20 pounds of pressure, goes flat or is replaced. Then the first check must be repeated to set the signal point.

Figure 6:
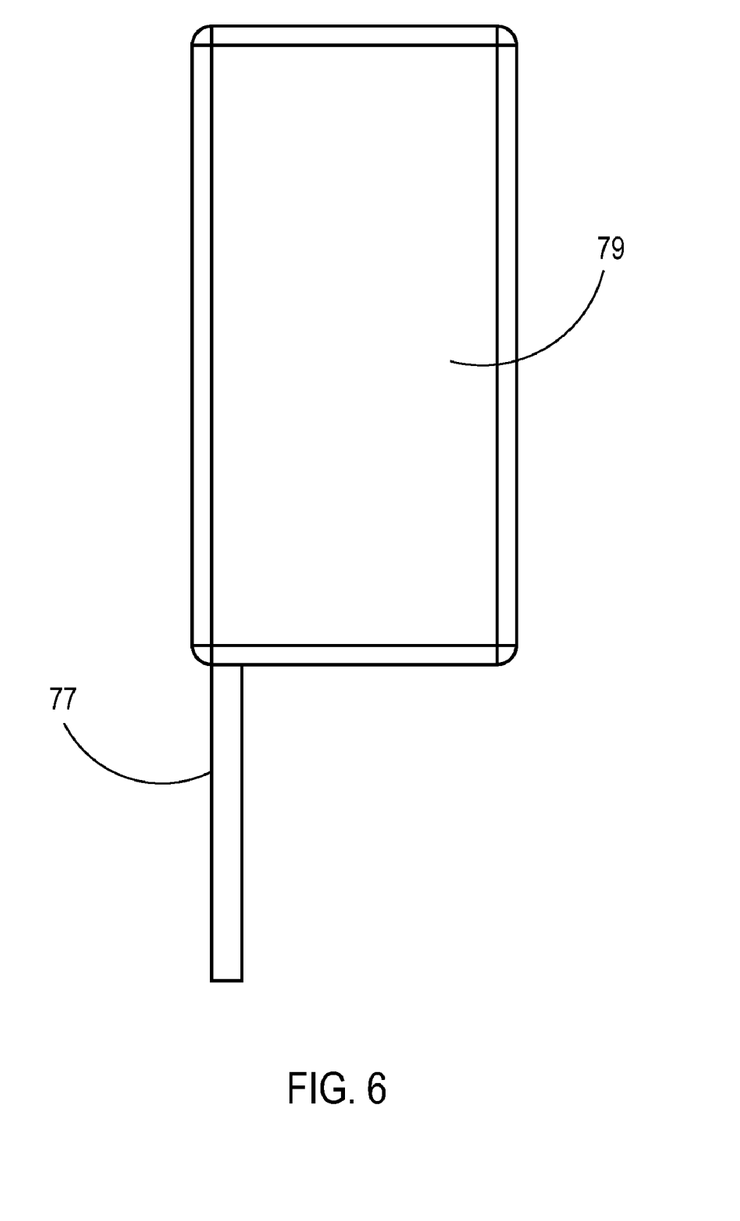
FIG. 6 is a side view of a booster antenna case.

In the event that the transmitter is further than 35 feet from the receiver, a repeater (booster) antenna can be used. The booster antenna is a combination of the receiver and transmitter reduced to fit into a small air tight plastic case, shown in FIG. 6, where the case 79 has a 24 inch power cord 77 and is substantially 2.5 inches wide, 4 inches high, and 1 inch thick. It should be used if the RF signal from a transmitter needs to travel more than 35 feet from the furthest tire to the receiver. By adding the repeated antenna, the signal distance will increase an additional 65 feet. It is recommended to attach it with a Velcro pad to the back cross member of the frame of the towing vehicle. A two foot weather proof electrical cord can be used to connect into the 12 volt electrical system of the towing vehicle.

Figure 4:
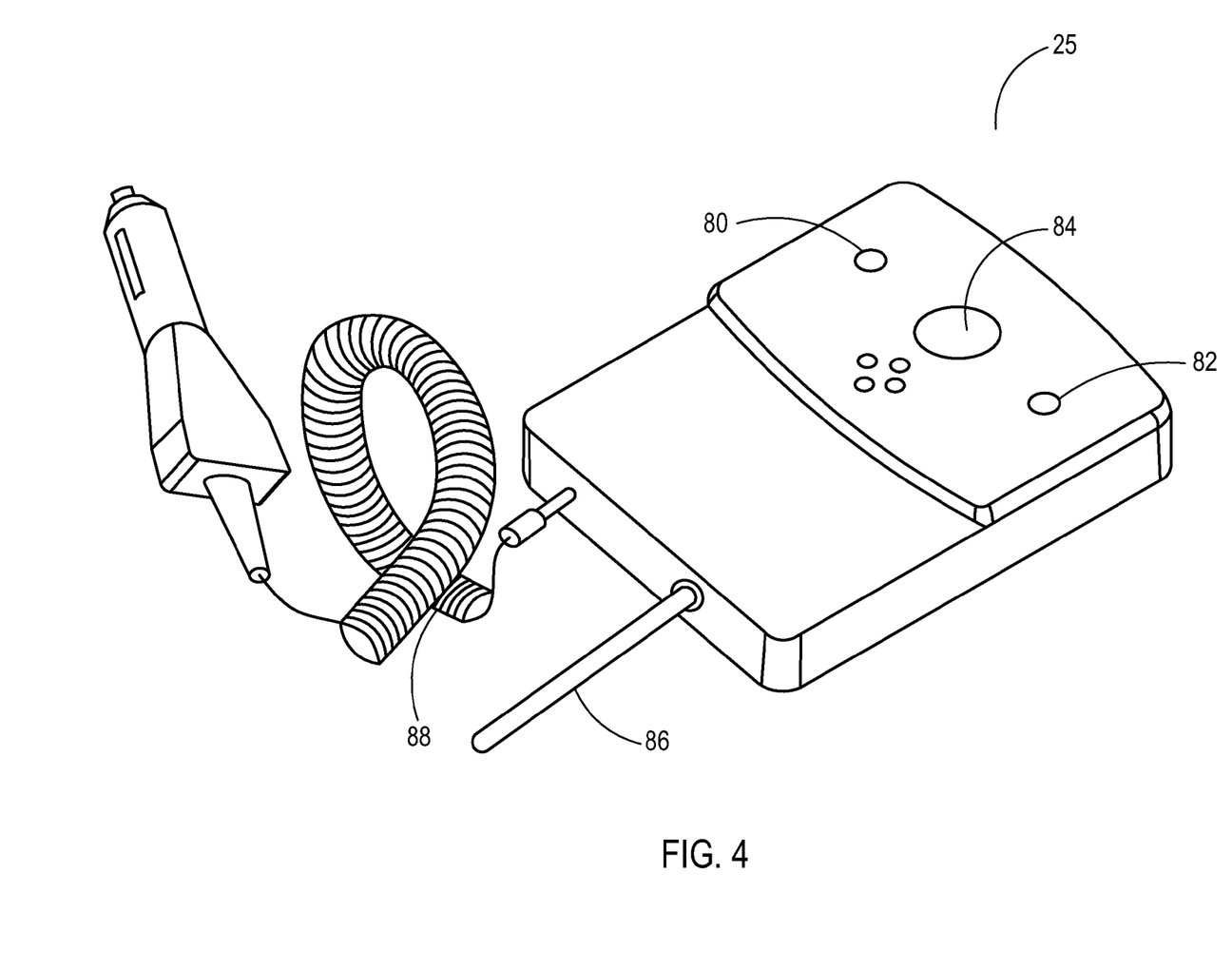
FIG. 4 is a perspective view of the receiver unit having an indicator mounted therein.

A receiver unit 25 is shown in FIG. 4. Receiver unit 25 is remotely situated with respect to transmitter units 19 and is preferably positioned in the cab of the vehicle. The receiver is a single encased unit containing one printed circuit board and attached components, and is powered by the 12 volt electrical system of the towing vehicle. It is capable or receiving an RF signal set at 434.9 mh from the transmitters mounted on or within the wheels of the towing vehicle or a trailer. If a driver has to travel a short distance after being made aware of a low tire pressure, he/she can press the mute button, 84, to shut the beeper off for up to 30 minutes, however, the red light LED, 80, will keep blinking.

The green LED, 82, will stay lit as long as power is on. Upon receiving a signal from any transmitter, the red LED will blink and the beeper will sound. Both will stay on if the signal continues, otherwise both will shut off within 15 seconds. The beeper can be silenced by pressing mute pad switch 83. The red LED will beep blinking a long as a signal is active. Both will shut off when there is no longer motion. The receiver is comprised of a printed circuit board, electrical components, red and green LED's, a 3 inch long screw on antenna 86, a case with Velcro pads on its back to allow it to be attached to a vehicle dash board, and a power cord 88, that plugs into the receiver and a cigarette lighter receptacle.

In another embodiment, the receiver is designed to receive RF signals from the transmitters when tire pressure drops 20 percent below normal operating pressure. It will also send an alert for high temperature. Both the red LED and the beeper will stay on if the signal continues, otherwise both will shut off within 15 seconds. The beeper can be silenced by pressing a MUTE pad. The red LED will keep blinking as long as the signal is active. Both will shut off when there is no longer motion.

Figure 5:
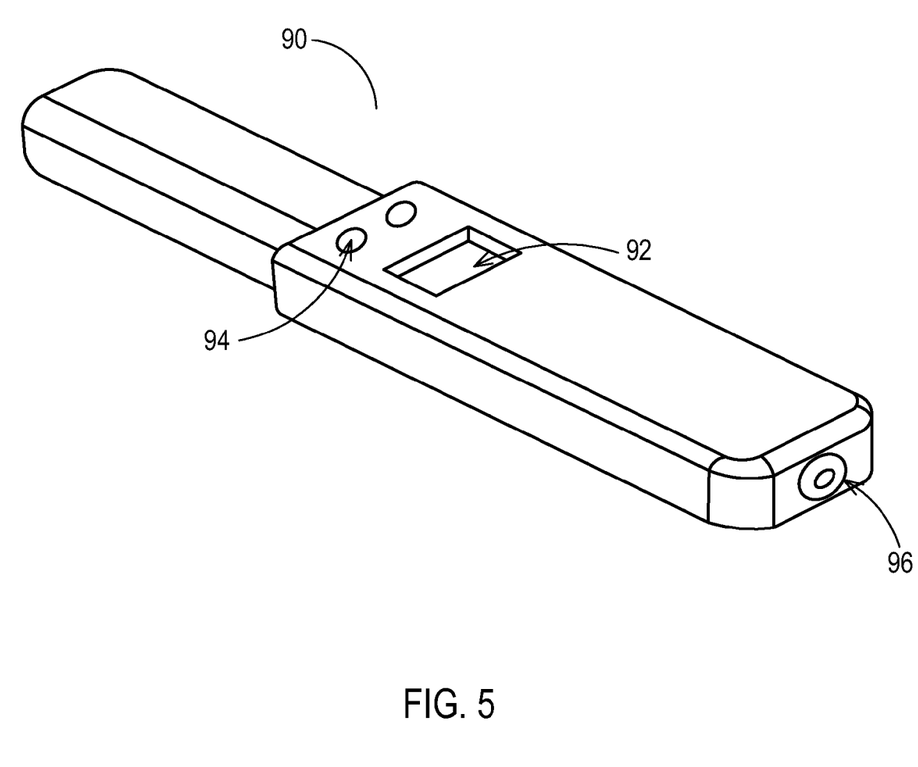
FIG. 5 is a side perspective view of a hand held pressure reader.

Referring to FIG. 5, there is shown the hand held pressure reader 90. The pressure reader, when pointed at the valve stem and is at a distance of from 2 to 10 inches from the valve stem, will communicate with the transmitter and read out through a frosted window, 92, the exact tire pressure within the tire. It will also set the signal pressure (20 percent below normal running pressure) when performing the first tire pressure check. It will not affect settings on future tire checks unless the tire goes below 20 pounds pressure, goes flat, or is replaced. Then a first check must be repeated to set the signal point. The signal point can be checked by holding the pressure reader within 2 to 10 inches of each valve stem and pressing a read momentary switch, 94.

An added feature is an LED flashlight, 96. It is activated by pressing a white pad below the frosted window. The pressure reader contains a printed circuit board, a digital display, an LED for activating pressure reading. Another LED is provided for the flashlight. All are powered with a replaceable 9 volt battery located within a durable plastic case.

Each tire to be monitored has a monitoring device 11 (see FIGS. 2C and 2D) attached to a special valve stem which positions the monitor either inside or outside of the tire, where the location of the monitoring device relative to the tire is determined by the size of the tire.

During monitoring operations, indicator 25 (see FIG. 4) will remain inactive until a monitored condition is sensed to be abnormal, such as the sensing of a predetermined low tire pressure or a predetermined high temperature where tire pressure and tire temperature are being monitored, after which the indicator will indicate to the vehicle operator that an abnormal tire condition has been detected. With the vehicle stopped, the operator can then readily determine the tire at fault, either by observation or by sounding or feeling the tires, and determine the step or steps to be taken to correct the fault. After correction, the indicator will again be inactive until another abnormal tire condition is sensed.

As can be appreciated from the foregoing, this invention provides an improved system, device and method that is particularly well suited for monitoring tires to detect abnormal tire conditions such as low tire pressure and/or high tire temperature.

While there have been shown and described and pointed out the fundamental novel features of the invention as applied to the preferred embodiments, it will be understood that various omissions and substitutions and changes of the form and details of the apparatus illustrated and in the operation may be done by those skilled in the art, without departing from the spirit of the invention.

What is claimed is:

1. A tire monitoring device, comprising: a sensor unit, said sensor unit including at least one of a pressure sensor and a temperature sensor with said sensor unit detecting at least one of predetermined low tire pressure and predetermined high tire temperature and providing output indications thereof; a transmitter unit connected with said sensor unit to receive said output indications there from and, responsive thereto, providing output signals; and a housing unit enclosing said sensor unit and said transmitter unit therein, said housing unit being configured to be positioned on the bottom of a first valve stem if located inside a tire of a vehicle or on a second valve stem if located outside a tire on a vehicle;

wherein said housing unit is located outside of the tire for a tire that is 20 inches and larger;

wherein said housing unit is located inside the tire for a tire that is 18 inches and less.

2. The device of claim 1 wherein said housing unit is located outside of the tire for a tire that is 20 inches.

3. The device of claim 1 wherein said housing unit is attached to a side of a valve stem and coupled thru the valve stem to air inside said tire.

4. The device of claim 1 wherein said housing unit is located inside the tire for a tire that is 18 inches.

* * * * *